UNITED STATES PATENT OFFICE.

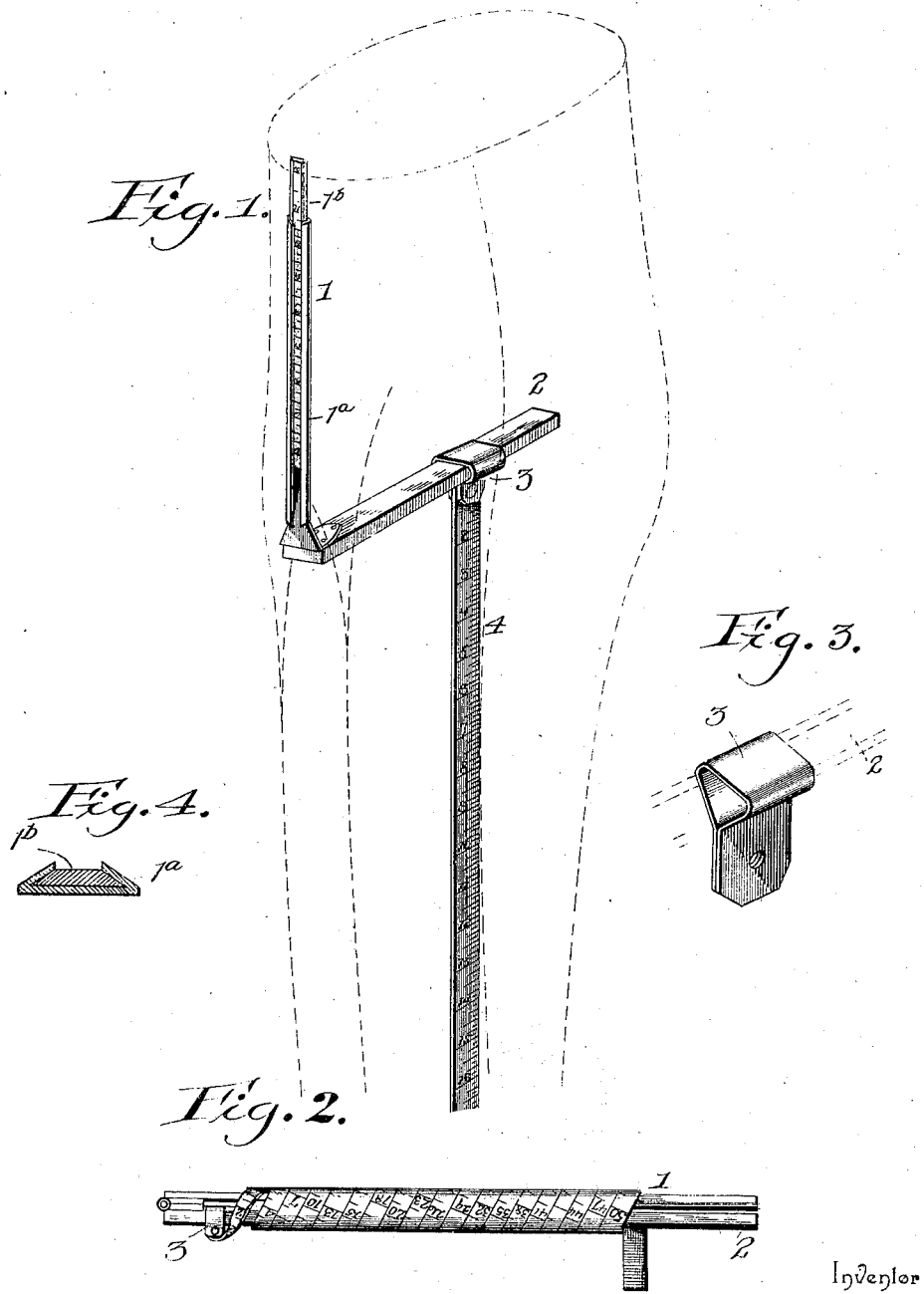

HERBERT CLAY BLUTHENTHAL, OF PINE BLUFF, ARKANSAS.

TAILOR'S MEASURE.

SPECIFICATION forming part of Letters Patent No. 629,025, dated July 18, 1899.

Application filed September 15, 1897. Renewed January 19, 1899. Serial No. 702,732. (No model.)

*To all whom it may concern:*

Be it known that I, HERBERT CLAY BLUTHENTHAL, a citizen of the United States, residing at Pine Bluff, in the county of Jefferson and State of Arkansas, have invented a new and useful Tailor's Measure, of which the following is a specification.

My invention relates to tailors' measures, and particularly to a device for taking trousers' measurements, the object in view being to provide a simple and convenient device whereby the inseam and the outside-seam measurements may be taken by one operation and to provide means whereby the measurements of the inseam and outside seam can be made to agree accurately without experiment.

It is the common practice in measuring for trousers to take the length of the inseam from the crotch to the inside of the foot at a suitable distance from the ground or floor and then take the measure of the outside seam from the top of the body portion of the trousers to a corresponding point at the outside of the foot, with the risk, obviously, of making the measure of the inseam extend to a point closer to the floor than the outside measurement, or vice versa.

Hence the object of my invention is to provide means for taking the measurements of the inside and outside seams, whereby the desired result is obtained by one application of a rule or tape, and thus avoiding the disadvantage, as above indicated, of the ordinary practice.

Further objects and advantages of this invention will appear in the following description, and the novel features thereof will be particularly pointed out in the appended claims.

In the drawings, Figure 1 is a view of a trousers-measure constructed in accordance with my invention, the same being shown applied. Fig. 2 is a view of the same folded. Fig. 3 is a detail view to show the sliding connection between the flexible or tape measure and the hinged arm of the inflexible measure or rule. Fig. 4 is a detail transverse section of the extensible arm.

Similar numerals of reference indicate corresponding parts in all the figures of the drawings.

The measure embodying my invention consists of an inflexible scale-arm or graduated rule 1, having a length preferably of about eighteen inches, and to this scale-arm or rule is hinged a guide-arm 2, preferably of a less length than the scale-arm and adapted to fold parallel therewith, as shown in Fig. 2. Attached to the guide-arm, preferably by means of a slide 3, which is mounted for adjustment on the guide-arm, is the upper end of a flexible or tape measure 4 of the ordinary or any preferred form now in common use by tailors.

In operation the guide-arm serves as a means whereby the upper end of the flexible or tape measure is held at the upper end of the inseam, the measurement of the inseam by means of said flexible or tape rule being taken in the ordinary way by carrying the latter down to the inside of the foot and noting the graduation at the proper distance from the ground or floor. The inflexible scale arm or rule extends upwardly, the graduations thereon being exposed at the front side of the arm, and by means of this inflexible arm or rule the measurement of the body portion of the trousers from the crotch to the upper edge of said body portion is determined according to the build and preference of the customer. By adding the measurement indicated by the inflexible scale or rule to that measurement indicated by means of the flexible rule for the length of the inseam the length of the outside seam is given. Thus with one measurement of the length of the leg and the addition thereto of the depth of the body portion of the trousers (obtained simultaneously with the measurement of the inseam) the lengths of both the inseam and the outside seam are determined.

The advantage of obtaining the measurements of the in and out seams by the means thus described is that in cutting the trousers the lengths of the in and out seams agree, or, in other words, the lower edge of the trousers-leg is made the same distance from the ground or floor at its inner and outer sides, and thus an accurate "hang" of the trousers-leg is obtained.

The advantage derived from connecting the flexible rule to the guide-arm by means of the slide resides in the fact that the upper end of the said flexible rule may be arranged at the desired point, or at the desired distance from the contiguous hinged end of the inflexible rule, it being obvious that this distance will vary according to the corpulence of the customer. When not in use, the inflexible members of the measure may be folded into compact form and the flexible rule wrapped therearound, as indicated in Fig. 2.

In the construction illustrated in the drawings the inflexible rule is of folding or telescoping construction, the body portion $1^a$, which is hinged to the guide-arm 2, being channeled to form a cross-sectionally-dovetailed guide, in which fits the graduated member $1^b$, the front surface of said graduated member being exposed through the open front side of the guide in the body portion of the rule. The graduations of the adjustable member increase downwardly or toward the body portion of the rule, and the upper extremity of the body portion forms an indicator, whereby when the upper extremity of the adjustable member is arranged at the desired height for the body portion of the trousers the measurement of said body portion is indicated on the adjustable member at the upper extremity of the body portion $1^a$. In practice the body portion $1^a$ is preferably made of a length of nine inches, and the adjustable member, which is of a corresponding length, is graduated from ten to sixteen inches, beginning at the upper end. The guide-arm is preferably of the same length as the body portion of the inflexible rule. This construction provides for a compact folding of the device, and hence provides for a portability desirable in measures of this class.

Various changes in the form, proportion, and the minor details of construction may be resorted to without departing from the spirit or sacrificing any of the advantages of this invention.

Having described my invention, what I claim is—

1. A tailor's measure having an inflexible bar or arm, an inflexible measuring-rule hingedly mounted upon the bar or arm, to swing toward and from the same in the plane thereof, and adapted to fold parallel therewith said measuring-rule comprising a body portion having a longitudinal guide or way, and a graduated slide fitted in said guide or way for extension beyond the extremity of the body portion of the rule, and a flexible measuring-rule, extending from the bar or arm in the opposite direction from the inflexible measuring-rule, and provided with a terminal slide mounted for adjustment upon the bar or arm, substantially as specified.

2. A tailor's measure having a bar or arm, an inflexible measuring-rule of sectional construction, comprising a body portion hingedly mounted upon the bar or arm at one end, and provided with a cross-sectionally-dovetailed guide having one side open, and a graduated cross-sectionally-dovetailed slide fitted in said guide with its graduated surface exposed through the open side of the guide, the length of the inflexible rule, when its members are folded, being approximately equal to the length of the bar or arm, and a flexible rule provided with a terminal slide mounted upon the bar or arm, to traverse the same throughout its length, and adapted to be coiled around the folded bar or arm and the inflexible rule as a core, substantially as specified.

In testimony that I claim the foregoing as my own I have hereto affixed my signature in the presence of two witnesses.

HERBERT CLAY BLUTHENTHAL.

Witnesses:
C. P. THORNTON,
T. N. HARPER.